March 13, 1951 S. K. WOLCOTT, JR 2,545,220
BALANCED VALVE
Filed May 25, 1949 2 Sheets-Sheet 1

SAMUEL K. WOLCOTT, JR.
INVENTOR.

BY
Burgess, Ryan and Hicks

March 13, 1951  S. K. WOLCOTT, JR  2,545,220
BALANCED VALVE

Filed May 25, 1949  2 Sheets-Sheet 2

SAMUEL K. WOLCOTT, JR.
*INVENTOR.*

BY
Burgess, Ryan and Hicks

UNITED STATES PATENT OFFICE 2,545,220

BALANCED VALVE

Samuel K. Wolcott, Jr., Elmira, N. Y., assignor to American-La France-Foamite Corporation, Elmira, N. Y., a corporation of New York Application May 25, 1949, Serial No. 95,197

1 Claim. (Cl. 251—98)

This invention relates to valves of the kind used, for example, to control water flow to fire hose lines supplied by a pump. In valves of this type, utilizing a rotatable flow control member located in the flow stream, the valve may readily hold its full open or full closed position; but, at intermediate settings, the entering stream of water exerts a torque on the valve tending to turn it to closed or open position.

Locks have been proposed for the purpose of securing the valve in any desired intermediate setting and while such locks have been satisfactory, if properly constructed and maintained, the present invention provides a valve so constructed as to enjoy a substantially balanced condition, even at intermediate settings, so as to relieve the locking device of the burden of restraining the valve from turning under the influence of stream-induced torque.

The invention will be readily understood from the accompanying drawings, of which:

Figure 1:
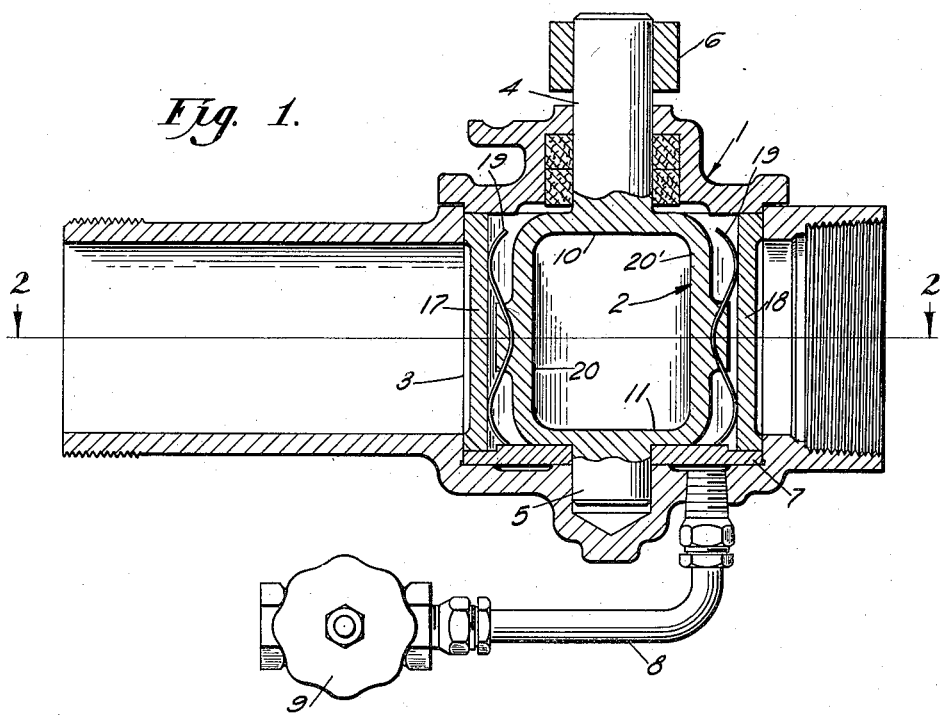
Fig. 1 is a vertical section through a valve having the invention applied to it in preferred form.

The particular valve shown in the drawings includes a valve housing, generally designated 1, having a water flow passage controlled by a flow control member, generally designated 2. The latter is rotatable in the cylindrical chamber 3 to open and close the flow passage, having upper and lower stub shafts 4 and 5 journaled in the housing walls, the shaft 4 carrying the usual valve control handle 6 at its upper end. The plate or disc 7, tubing 8 and valve 9 constitute a known type of locking device and control, which form no part of the present invention and which, hence, require no detailed description herein, it being sufficient for present purposes to note that the plate 7 is keyed or otherwise secured to stub shaft 5 or to the valve itself, so as to rotate with it.

Figure 4:
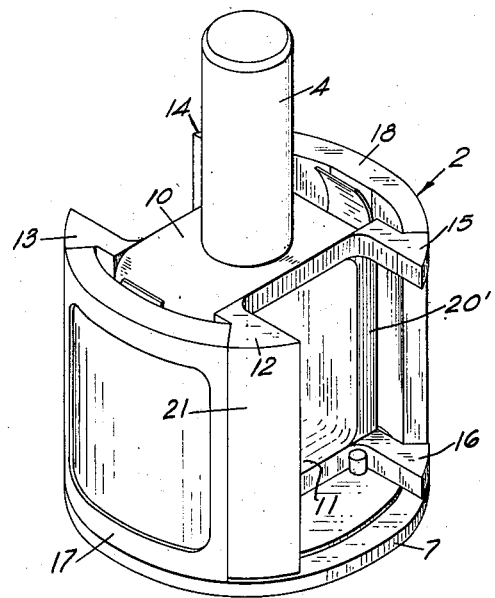
Fig. 4 is a perspective view of the valve removed from its housing.

Valve 2 is of a more or less cage-like construction, including upper and lower cross-bars 10, 11 extending diametrically of the valve axis. Each cross-bar has four, symmetrically spaced, flange portions, those of the upper bar appearing in Fig. 4, designated 12, 13, 14, 15. One of the identical flange portions of the lower cross-bar appears in Fig. 4, designated 16. All of these flange portions extend substantially to the circumference of chamber 3; and arcuate shoes 17, 18 are located between upper and lower pairs of the flange portions, the shoes being biased outwardly by springs 19 (Fig. 1) in the usual or any preferred manner. The upper and lower cross-bars are united at their ends by walls 20, that is, behind the shoes.

Three only of the upper cross bar flange portions, viz., 12, 13 and 14, are united with the three corresponding flange portions of the lower crossbar by legs 21, 22, 23, the outer faces of the legs being shaped to conform to the curvature of the wall of chamber 3. As will be understood, there is slight clearance between the legs and the chamber wall, engagement with the wall being effected by shoes 17, 18.

It will be noted that a connecting leg is omitted so far as flange portions 15, 16 are concerned, with the result that, in horizontal section, the through passage of the valve is asymmetrical, being larger at the lower end (as viewed in Figs. 2 and 3) than at the upper end. The larger opening is at the inlet end of the passage. As viewed in the horizontal sections, Figs. 2 and 3, it will be seen that the through passage is bounded by a flat continuous wall on one side; whereas on the other side, the flat, continuous wall extends from the outlet end to a point intermediate the middle of the valve and the inlet opening. At that point the through passage is expanded, so that the inlet opening is bounded on the one side by leg 21 and on the other side by the end face of shoe 18.

Figure 2:
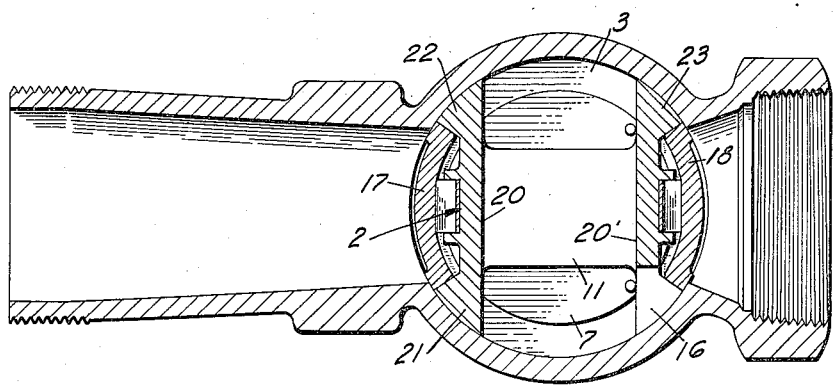
Fig. 2 is a horizontal section on the line 2—2 of Fig. 1.
Figure 3:
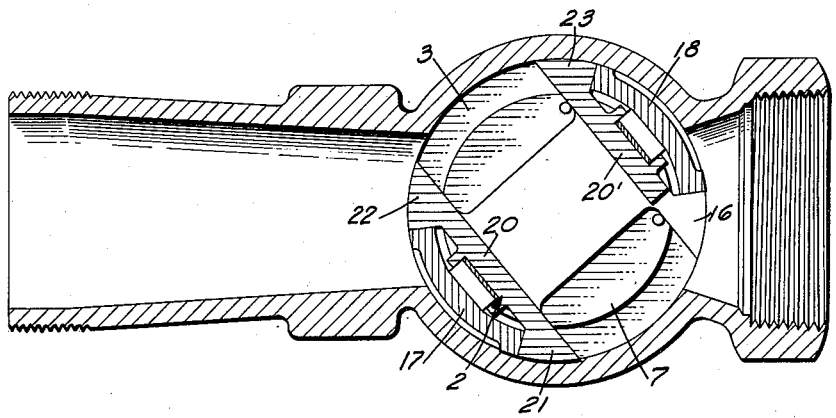
Fig. 3 is a similar section but with the valve in a different position.

In the Fig. 2 or closed position of the valve, the flow is completely shut off by shoes 17, 18, but in any intermediate open position, such as in Fig. 3 (the water flowing from right to left), the inlet opening is larger than the outlet opening, with the result that the velocity of the incoming stream, and its turbulence, are reduced.

More importantly, however, the effect of the described arrangement is to relieve the valve of any serious tendency to be rotated toward its closed position, from an intermediate setting (such as in Fig. 3) by the entering stream of water. Referring to Fig. 3, it has been found that if a fourth leg is provided, uniting flange portions 15, 16 and thereby equalizing the inlet and outlet openings, the stream impinges so directly on the near end of wall 20 as to exert appreciable turning torque on the valve (in a direction to close it); whereas, with the structure illustrated, the stream flow follows a more diagonal path toward the outlet and the valve is substantially balanced.

It will be understood that the construction described above represents the presently preferred form of the invention and exemplifies its principles, without limitation to the details of such construction.

In the light of the foregoing, the following is claimed:

In a valve structure including a water flow passage incorporating a valve chamber of cylindrical section, its axis extending transversely of the direction of water flow and a valve mounted for rotation in said chamber, the valve having upper and lower cross-bars extending diametrically of the valve axis, said bars each having four symmetrically spaced flange portions extending from their ends substantially to the circumference of the valve chamber, opposed shoes located between upper and lower pairs, respectively, of said flange portions, the improvement which comprises axially extending legs connecting three only of the upper flange portions with their corresponding lower flange portions, whereby the sides of a flow opening at one side of the valve are defined by two legs and the sides of the flow opening at the other side of the valve are defined by one leg and one shoe, the area of the second-mentioned flow opening exceeding that of the first to the extent of the omitted fourth leg.

SAMUEL K. WOLCOTT, Jr.

REFERENCES CITED

The following references are of record in the file of this patent:

FOREIGN PATENTS

| Number | Country | Date |
|--------|---------|------|
| 18,995 | Great Britain | of 1891 |